United States Patent
Kim

(10) Patent No.: US 11,407,405 B2
(45) Date of Patent: Aug. 9, 2022

(54) SYSTEM, METHOD, INFRASTRUCTURE, AND VEHICLE FOR AUTOMATED VALET PARKING

(71) Applicants: Hyundai Motor Company, Seoul (KR); Kia Motors Corporation, Seoul (KR)

(72) Inventor: Min Su Kim, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 225 days.

(21) Appl. No.: 16/731,879

(22) Filed: Dec. 31, 2019

(65) Prior Publication Data
US 2020/0207337 A1 Jul. 2, 2020

(30) Foreign Application Priority Data
Dec. 31, 2018 (KR) .................. 10-2018-0173397

(51) Int. Cl.
  *B60W 30/06* (2006.01)
  *G05D 1/02* (2020.01)
  *G08G 1/14* (2006.01)

(52) U.S. Cl.
  CPC .......... *B60W 30/06* (2013.01); *G05D 1/0212* (2013.01); *G08G 1/146* (2013.01)

(58) Field of Classification Search
  CPC ........ B60W 30/06; B60W 2050/0075; B60W 2556/45; G05D 1/0212; G08G 1/146; G08G 1/143; G08G 1/168; G08G 1/096725; G08G 1/14; B62D 15/0285; B60Y 2300/06

USPC ..................................... 701/25–28
See application file for complete search history.

(56) References Cited

U.S. PATENT DOCUMENTS

| 10,336,384 B2* | 7/2019 | Nordbruch ........... G06Q 50/04 |
| 10,546,495 B2* | 1/2020 | Stefik .................. G06Q 10/02 |
| 2002/0163443 A1* | 11/2002 | Stewart ................. G08G 1/005 340/932.2 |
| 2008/0012726 A1 | 1/2008 | Publicover |
| 2012/0188100 A1* | 7/2012 | Min ....................... E04H 6/426 340/932.2 |
| 2014/0306833 A1* | 10/2014 | Ricci ..................... G06F 21/00 340/901 |
| 2014/0309789 A1* | 10/2014 | Ricci ..................... H04W 4/21 700/276 |
| 2015/0279210 A1* | 10/2015 | Zafiroglu ............... G08G 1/065 340/932.2 |
| 2016/0155331 A1* | 6/2016 | Mielenz ................ G08G 1/14 340/932.2 |

(Continued)

FOREIGN PATENT DOCUMENTS

WO  WO-2016131622 A1 *  8/2016  ........... G08G 1/146

OTHER PUBLICATIONS

WO2016131622A1.translate (Year: 2016).*

*Primary Examiner* — B M M Hannan
(74) *Attorney, Agent, or Firm* — Slater Matsil, LLP

(57) ABSTRACT

An apparatus for automated valet parking includes a transceiver and a processor. The transceiver is configured to receive vehicle information from a vehicle and transmit a target position and a guide route to the vehicle. The processor is configured to determine a parking policy based on the vehicle information received and parking lot information stored and to determine the target position and the guide route based on the determined parking policy.

20 Claims, 11 Drawing Sheets

(56) References Cited

U.S. PATENT DOCUMENTS

| | | | |
|---|---|---|---|
| 2017/0297625 A1* | 10/2017 | Irion | G08G 1/148 |
| 2017/0313307 A1* | 11/2017 | Nordbruch | G01C 21/20 |
| 2017/0351267 A1* | 12/2017 | Mielenz | G05D 1/0289 |
| 2018/0149483 A1* | 5/2018 | Maier | G08G 1/015 |
| 2019/0087877 A1* | 3/2019 | Tashiro | G08G 1/0175 |
| 2020/0198620 A1* | 6/2020 | Nakata | H04W 4/024 |
| 2020/0234593 A1* | 7/2020 | Mergenthaler | G08G 1/146 |
| 2020/0272950 A1* | 8/2020 | Xu | G06Q 10/06314 |
| 2021/0114585 A1* | 4/2021 | Sugano | B62D 15/0285 |

\* cited by examiner

FIG. 4A

| Step | Infra | Vehicle |
|---|---|---|
| <1> AVPS START | * Recognize and qualify an appropriate user (by user ID and PW) and vehicle (by unique number assigned to vehicle)<br>* Manage driving authority (receiving driving authority from the user/return the driving authority to the user<br>* Transmit automated driving start instruction to vehicle | * perform engine ON/OFF or power ON/OFF according to the instruction of infra<br>* Lock the vehicle according to the instruction of infra |
| <2> DETERMINATION OF TARGET POSITION AND GUIDE ROUTE | * Determine the target position, guide route, and permissive driving area, and deliver those information to vehicle | |
| <3> AUTONOMOUS DRIVING | * instruct automated driving (start, stop, re-start) to vehicle | * Drive along the guide route designated by infra within the permitted driving area at a speed of 10km/h or less<br>* Drive within the path and width designated by infra without deviation<br>* Drive along a curve with the minimum inner radius of the vent designated by the infra without deviation<br>* Drive on a path with the gradient less than or equal to the maximum gradient designated by infra |
| <4> POSITION MEASUREMENT (vehicle, obstacle) | * Be aware of and manage vehicle location<br>* Detect and recognize vehicles and obstacles (TBD), and monitor safety driving and parking operation of each vehicle (supervise) | * Estimate its own position<br>* Inform the infra of its estimated position / with the accuracy and frequency specified below (TBD)<br>* Inform the infra of its own status<br>* Detect the following obstacles (TBD) |
| <5> AUTONOMOUS PARKING | | * Park and Stop the vehicle at the target position designated by infra (equivalent to PAPS parking requirements) |

FIG. 4B

| Step | Infra | Vehicle |
|---|---|---|
| <6> EMERGENCY BRAKE | * Continue to instruct automated driving to vehicle when safety is ensured as a result of safety confirmation, and to instruct the vehicle to perform an emergency stop, if safety is not confirmed | * Start/emergency stop/re-start automated driving according to the instruction of infra<br>* perform an emergency stop in case where a potential hazard is determined as a result of the detection mentioned above<br>* Immediately decelerate at the rate of (TBD) m/s and stop, when the following conditions are met<br>(1) vehicle received an instruction from infra for E/S<br>(2) vehicle detected an obstacle (TBD)<br>* After coming to a stop, the vehicle shall remain stopped until it receives an instruction from infra to resume automated driving<br>* Vehicle shall re-start suspended driving or parking when it receives an instruction to start automated driving from the infra after confirming that there is no obstacle ahead in the path |
| <7> AVPS END | *After the vehicle completes automated driving and parking, the infra transmits Vehicle control release instruction to the vehicle | * Perform engine ON/OFF or power ON/OFF according to the instruction of infra<br>* Lock the cehicle according to the instruction of infra<br>* Mechanically fix or restrain wheels using such as the parking brake |
| <8> FAULT CONTROL (communication or vehicle fault) | * Detect communication faults between the infra and vehicle | * Detect faults in communication with infra during driving<br>* Detect vehicle's faults (e.g. part failure, human or animal remaining inside the vehicle, etc.)<br>* Perform emergency stop when above fault is detected<br>* After coming to a stop, the vehicle shall remain stopped until it receives an instruction from infra to resume automated driving |

FIG. 5

| DATA | Contents | Transmit (T)/ Receive (R) | | Regularly(F)/ Event(E) Transmission | Note |
|---|---|---|---|---|---|
| | | infrastructure | Vehicle | | |
| (1) Vehicle qualification information | ID number (VIN) to identify yeach vehicle | R | T | E When entering the parking | |
| (2) Automated driving preparation instruction | — | T | R | E Right before automated driving start | |
| (3) Vehicle information notification | Vehicle state (normal stop/driving/emergency stop, et c.) Vehicle position[should] | R | T | F (1 Hz) | This is also used for communication fault check by the vehicle |
| (4) Vehicle information response | — | T | R | F (1 Hz) | |
| (5) Target position * guide route Delivery | Target position * passing point location/Permitted time to pass through the point Maximum speed | T | R | E After automated driving instruction | |
| (6) Driving boundaries delivery | A group of lines to surround the permitted driving area | T | R | E after automated driving preparation instruction | |
| (7) Automated driving start instruction | — | T | R | E After delivery of guide route and driving boundaries, when restarting after emergency stop | |
| (8) Emergency stop instruction | — | T | R | E | |
| (9) Vehicle control release instruction | — | T | R | E | |

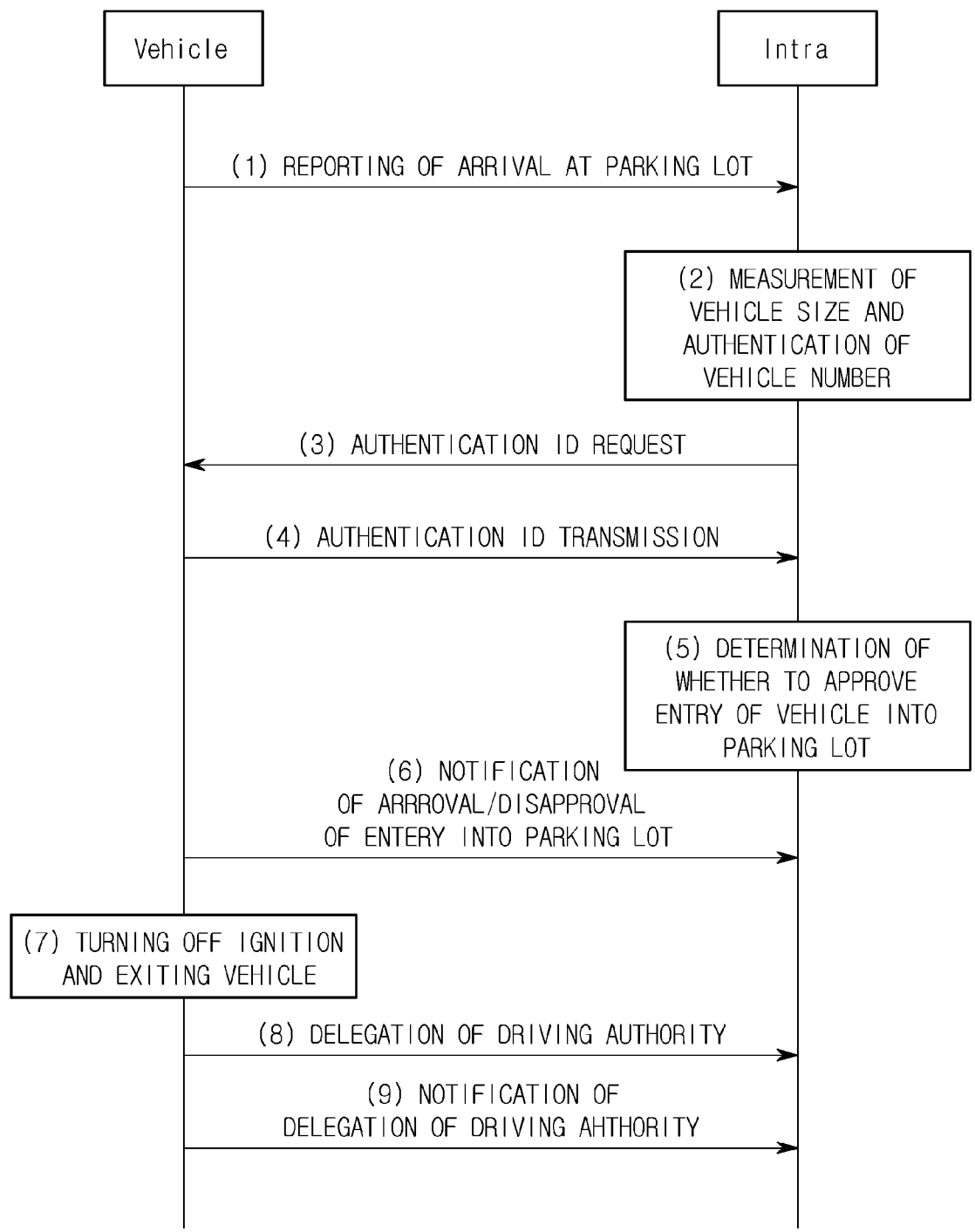

SYSTEM, METHOD, INFRASTRUCTURE, AND VEHICLE FOR AUTOMATED VALET PARKING

CROSS-REFERENCE TO RELATED APPLICATIONS

This application claims priority to Korean Patent Application No. 10-2018-0173397, filed on Dec. 31, 2018, which application is hereby incorporated herein by reference.

TECHNICAL FIELD

Embodiments of the present invention relates to a system, method, infrastructure, and vehicle for performing automated valet parking.

BACKGROUND

Many modern cities suffer from various parking-related issues. For example, there is a high risk of a car collision in a parking lot. For parking in crowded places such as large shopping centers, it takes long time and much energy to park a vehicle due to traffic congestion before entering a parking lot. In addition, it takes long time and much energy to locate a vacant parking space even after entering a parking lot. In addition, there is inconvenience that a driver has to move to a spot at which his or her vehicle is parked at the time of leaving the visited area or that a driver often has difficulty in retrieving his or her vehicle without remembering the place where his or her vehicle is parked.

SUMMARY

Embodiments of the present invention relates to a system, method, infrastructure, and vehicle for performing automated valet parking. Embodiments enable an unmanned vehicle to autonomously move to and park in a vacant parking space by communicating with a parking infrastructure. Embodiments enable an unmanned vehicle to autonomously move from a parking space to a pickup zone by communicating with a parking infrastructure.

The present disclosure has been made in view of problems occurring in the related art and embodiments of the present disclosure can enable an automated valet parking service by which a driver can leave his or her vehicle at a predetermined drop-off zone and the vehicle without the driver seated autonomously moves to and parks in a vacant parking space within a parking lot.

Other embodiments of the present invention can enable an automated valet parking service by which a vehicle that has been parked autonomously moves from a parking space to a predetermined pickup zone so that the driver can conveniently leave the parking lot.

According to embodiments of the present disclosure, an automated valet parking apparatus includes a processor and a transceiver. The transceiver receives vehicle information from a vehicle and transmits a target position and a guide route to the vehicle. The processor determines a parking policy on the basis of the vehicle information received and parking lot information stored and determines the target position and the guide route according to the determined parking policy.

According to embodiments of the present disclosure, an automated valet parking method can be performed by a parking infrastructure. The method includes receiving vehicle information, determining a parking policy on the basis of the vehicle information that is received and parking lot information that is stored, determining a target position and a guide route, and transmitting the target position and the guide route to the vehicle.

A program containing instructions for executing the automated valet parking method according to embodiments of the present disclosure is stored in a computer-readable non-transitory recording medium.

BRIEF DESCRIPTION OF THE DRAWINGS

The above and other features and other advantages of the present invention will be more clearly understood from the following detailed description taken in conjunction with the accompanying drawings, in which:

FIGS. 4A and 4B are diagrams illustrating operations performed by a parking infrastructure and a vehicle for automated valet parking, according to one embodiment of the present disclosure;

FIG. 5 is a diagram illustrating a communication process performed by a vehicle and a parking infrastructure for automated valet parking according to one embodiment of the present disclosure;

FIG. 6 is a diagram illustrating a communication process performed by a vehicle and a parking infrastructure for automated valet parking according to one embodiment of the present disclosure;

DETAILED DESCRIPTION OF ILLUSTRATIVE EMBODIMENTS

Figure 1:
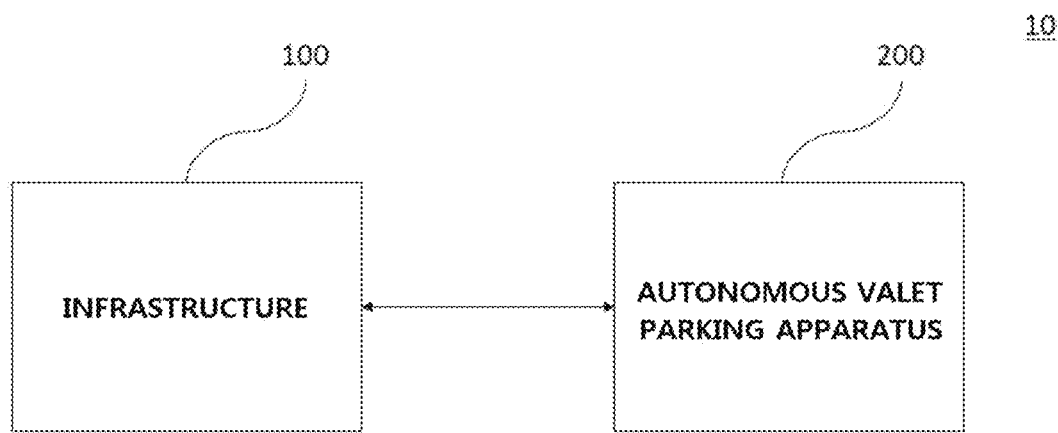
FIG. 1 is a diagram illustrating an automated valet parking system according to one embodiment of the present disclosure.

Herein below, exemplary embodiments of the present disclosure will be described in detail with reference to the accompanying drawings. The construction and operational effect of the present disclosure will be clearly understood from the following detailed description. Prior to describing exemplary embodiments of the present disclosure in detail, it is noted that throughout the drawings the same components will be denoted by the same reference numerals as possible and a detailed description about existing components and functions is omitted when the subject matter of the present disclosure may be obscured by the description.

It is also noted that terms used in the detailed description of the present disclosure are defined below.

The term "driver" refers to a person who uses an automated valet parking service provided by an automated valet parking system.

The term "driving authority" refers to the authority to perform vehicle operations. The term "vehicle operation" refers to an operation such as steering, accelerating, braking, gear shifting, vehicle starting, and door locking and unlocking of a vehicle.

The term "vehicle" refers to a vehicle having an autonomous valet parking feature.

The term "control center" refers to a facility that can monitor vehicles parked in a parking garage or facility, which determines a target position, a guide route, and a permitted driving area, and which transmits a driving start command or an emergency stop command to a vehicle.

The term "infrastructure" refers to a parking facility or sensors installed in the parking facility. Alternatively, in some cases, the term "infrastructure" may refer to a control center that controls a parking lot gate, vehicles in a parking lot, etc.

The term "target position" refers to an empty space available for parking. Alternatively, in a case where drivers leave a parking lot, the term "target position" may refer to a pickup zone where the drivers get in their vehicles.

The term "guide route" refers to a route along which a vehicle's to reach a target position. For example, in a case of performing parking, the guide route refers to a route along or according to which a vehicle needs to navigate from a drop-off zone to an empty space. For example, the guide route is provided in the form of instructions, for example, "driving forward a distance of 50 m and turning left at the corner".

The term "driving route" refers to a driving path along which a vehicle drives.

The term "permitted driving area" refers to an area where a vehicle can drive in a parking lot. For example, the permitted driving area includes the driving route. The permitted driving area is defined with barrier walls, parked vehicles, parking lines, etc.

FIG. 1 is a diagram illustrating an automated valet parking system according to one embodiment of the present disclosure. Referring to FIG. 1, an automated valet parking system 10 includes a parking infrastructure 100 and an autonomous valet parking apparatus 200.

The infrastructure 100 refers to a device, facility or system for operating, managing, and controlling an automated valet parking system. For example, the infrastructure 100 may be a parking facility. According to embodiments, the infrastructure 100 includes sensors, communication devices, alarm devices, display devices, and a server that controls those devices and sensors. Alternatively, in some cases, the term "infrastructure" may refer to a control center that controls a parking lot gate, vehicles in a parking lot, etc.

The infrastructure 100 includes a transceiver for performing communication and a processor for performing computation. According to embodiments, the infrastructure 100 may further include sensors for detecting surrounding objects and parameters. In the present disclosure, determinations and computations performed by the infrastructure 100 are performed by the processor.

The autonomous valet parking apparatus 200 refers to a vehicle that can perform autonomous valet parking. According to embodiments, the autonomous valet parking apparatus 200 refers to a component or a set of components capable of performing autonomous valet parking.

Figure 2:
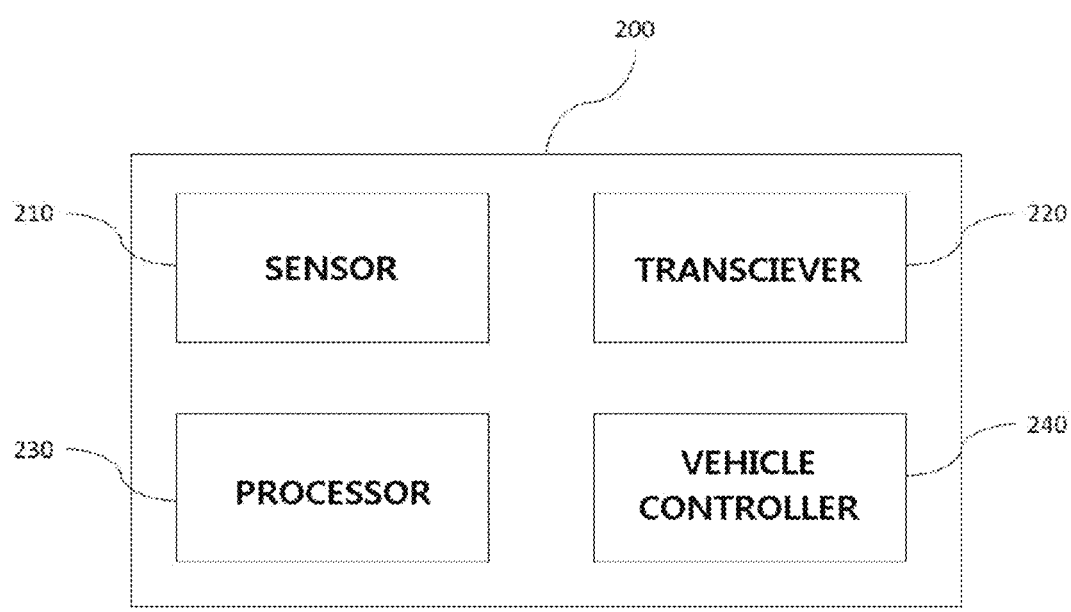
FIG. 2 is a diagram illustrating an autonomous valet parking apparatus according to one embodiment of the present disclosure.

FIG. 2 is a diagram illustrating an autonomous valet parking apparatus according to one embodiment of the present disclosure. Referring to FIG. 2, the autonomous valet parking apparatus (for example, vehicle 200) includes a sensor 210, a transceiver (or communication circuit) 220, a processor 230, and a vehicle controller 240.

The sensor 210 monitors the surroundings of the autonomous valet parking apparatus 200. According to embodiments, the sensor 210 measures the distance between the autonomous valet parking apparatus 200 and a specific object or detects a nearby object. For example, the sensor 210 includes at least one of the sensors selected from among an ultrasonic sensor, a RADAR sensor, a LIDAR sensor, a camera, an infrared sensor, a thermal sensor, and a millimeter wave sensor.

The sensor 210 transmits data resulting from sensing or measurements to the transceiver 220 or to the vehicle controller 240.

The transceiver 220 exchanges data with the infrastructure 100. This communication is called vehicle-to-infra (V2I) communication. In addition, the transceiver 220 can exchange data with other vehicles. This communication is called vehicle-to-vehicle (V2V) communication. The V2I communication and the V2V communication are collectively called vehicle-to-everything (V2X) communication. According to embodiments, the transceiver 220 receives data such as a target position, a guide route, a navigation route, a command, etc. from the infrastructure 100, processes the received data, and transmits the resulting data to the processor 230. The transceiver 220 transmits data collected and generated by the vehicle 220 to the infrastructure 100. According to embodiments, the transceiver 220 exchanges data with a terminal device of the driver of the vehicle 200.

The transceiver 220 receives and transmits data by using a wireless communication protocol or a cable communication protocol. Examples of the wireless communication protocol include, not limitedly, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include, but are not limited to, wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present invention.

The processor 230 controls the overall operation of the vehicle 200. The processor 230 controls the vehicle controller 240 on the basis of the data transmitted from the sensor 210 and the transceiver 220. According to embodiments, the processor 230 generates a control signal for adaptively controlling the vehicle controller 240 according to the data transmitted from the infrastructure 100 and transmits the control signal to the vehicle controller 240.

That is, the processor 230 refers to a device that performs a series of computations or makes a series of determinations to control the vehicle 200 for the purpose of autonomous valet parking. For example, the processor 230 may be a processor capable of executing a software program including instructions for performing autonomous valet parking. Examples of the processor 230 include a central processing unit (CPU), a micro controller unit (MCU), an application specific integrated circuit (ASIC), a field programmable gate array (FPGA), and a graphic processing unit (GPU) but are not necessarily limited thereto.

The vehicle controller 240 controls the operation of the vehicle 200 according to the control signal issued by the processor 230. According to embodiments, the vehicle controller 240 controls the vehicle 200 in response to the control signal transmitted from the processor 230. For example, the vehicle controller 240 controls various vehicle operations such as driving, stopping, resuming of driving, steering, accelerating, decelerating, parking, lamp lighting, alarm sounding, etc.

That is, it will be appreciated that the vehicle controller 240 can perform all the functions for controlling the operations of the vehicle 200. That is, the vehicle controller 240 may include a driving unit, a braking unit, a steering unit, an acceleration unit, an alarming unit, and a lighting unit.

On the other hand, although not described herein, the operations and/or functions of the vehicle 200 described in the description herein are performed by the conjunction of one or more components selected from among the sensor 210, the transceiver 220, the processor 230, and the vehicle controller 240.

Figure 3:
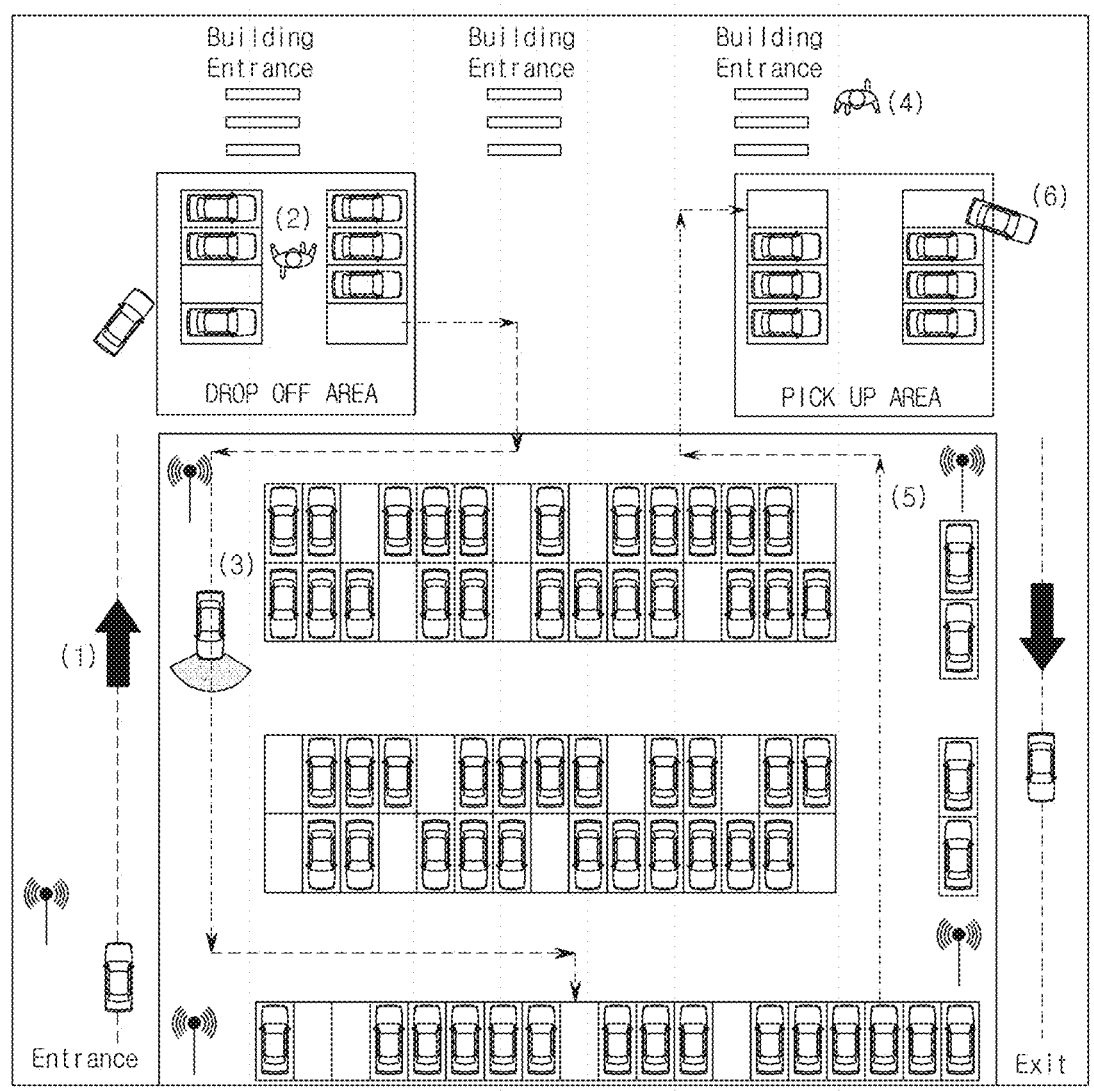
FIG. 3 is a conceptual diagram illustrating an automated valet parking system and method according to one embodiment of the present disclosure.

FIG. 3 is a conceptual diagram illustrating an automated valet parking system and method according to one embodiment of the present disclosure.

Referring to FIG. 3, in step (1), a driver drives a vehicle to a drop-off zone in a parking lot.

In step (2), the driver leaves the vehicle at the drop-off zone and the authority to drive or control the vehicle is delegated to the infrastructure.

In step (3), the infrastructure searches for empty parking slots among all the parking slots in the parking lot and assigns a suitable empty parking slot among the empty parking slots to the vehicle. The infrastructure determines a guide route which guides the vehicle to the assigned empty parking slot. After the parking slot and the guide route are determined, the vehicle autonomously drives along the guide route to reach the assigned parking slot and performs autonomous parking at the parking slot.

In step (4), the driver moves to a pickup zone where the vehicle will pick up the driver when the driver wants to leave the parking lot.

In step (5), the infrastructure determines a suitable target position. For example, the suitable target position may be an empty parking slot of multiple parking slots within the pickup zone. The infrastructure determines a guide route which leads the vehicle to the target position. After the target position and the guide route are determined and transmitted to the vehicle, the vehicle autonomously drives along the guide route to reach the target position and performs autonomous parking.

In step (6), the driver arrives at the pickup zone and takes over the authority to drive the vehicle. The driver drives the vehicle toward the exit of the parking lot.

FIGS. 4A and 4B are diagrams illustrating operations performed by a parking infrastructure and a vehicle for automated valet parking, according to one embodiment of the present disclosure.

In step (1), operations of the infrastructure and the vehicle to start automated valet parking are performed. The infrastructure identifies the driver and the vehicle and determines whether the driver and the vehicle are qualified. For example, the infrastructure determines whether the driver is a qualified driver by reading an identification number (ID) or a password input by the driver. In addition, the infrastructure determines whether the vehicle is a qualified vehicle by reading to a vehicle identification number of the vehicle. The vehicle can turn on and off the engine by itself. The vehicle can turn on and off the power supply by itself. For example, a state in which the engine of the vehicle is turned off and the power supply is turned on is referred to as an accessory-on (ACC-On) state. The engine on/off and the power supply on/off of the vehicle are performed according to instructions transmitted from the infrastructure or automatically performed without depending on the instructions transmitted from the infrastructure.

The vehicle can lock and unlock the doors by itself. The locking/unlocking of the vehicle doors is performed according to instructions transmitted from the infrastructure or is automatically performed without depending on the instructions from the infrastructure. When the vehicle proceeds to an autonomous parking step, it is preferable to lock the vehicle doors. In addition, the driving authority of the vehicle is delegated to the infrastructure from the vehicle. The driving authority means an authority to control vehicle operations. The vehicle operations include steering, accelerating, braking, gear shifting, ignition turning, and door locking and unlocking. Since the driving authority of the vehicle is delegated to the infrastructure, the infrastructure takes complete control of the vehicle during the automated valet parking of the vehicle. Accordingly, the likelihood that an unintended operation of the vehicle occurs is lowered and vehicle accidents in the parking lot are prevented. However, in some cases, the driving authority may be partially delegated to the infrastructure so that the vehicle can still control some of the vehicle operations, or the driving authority may be shared by the vehicle and the infrastructure.

For example, a braking operation may be performed when an emergency occurs during the autonomous valet parking procedure. Therefore, it is preferable for the vehicle to apply a brake without intervention of the infrastructure when the vehicle senses a danger with help of an ADAS sensor. In addition, the vehicle checks whether a person or animal is present in the vehicle. Since a parking duration from the completion of the autonomous valet parking to the discharging of the vehicle from a parking lot is long, if a person or animal is accidently left in the vehicle, the person or animal would be in danger. Therefore, it is important to ensure that the vehicle is empty before the vehicle is parked. Whether a person or animal is present in the vehicle may be checked with a sensor mounted on the vehicle.

In step (2), a process of determining a target position, a guide route, and a driving route is performed. The determination of the target position, the guide route, and the driving route is performed by the infrastructure. The target position, the guide route, and the driving route determined by the infrastructure are delivered from the infrastructure to the vehicle.

In step (3), an autonomous driving operation is performed in the parking lot. The autonomous driving of the vehicle includes driving, stopping, and resuming of driving. The autonomous driving of the vehicle is performed according to instructions transmitted from the infrastructure to the vehicle. Alternatively, the autonomous driving of the vehicle may be performed without relying on the instructions from the infrastructure. The vehicle can autonomously drive to the target position along the guide route within a permitted driving area. During the driverless autonomous driving of the vehicle, the vehicle is controlled to drive at a preset speed or below. This preset speed may be a value transmitted from the infrastructure to the vehicle or may be a value stored in the vehicle. In addition, the vehicle is controlled not to deviate beyond an error margin from the given guide route when driving along the guide route. This preset error margin may be a value transmitted from the infrastructure to the vehicle or may be a value stored in the vehicle. In addition, the vehicle may turn with a predetermined minimum turning radius when it is necessary to turn during the autonomous driving along the guide route. This preset minimum turning radius may be a value transmitted from the infrastructure to the vehicle or may be a value stored in the vehicle. The vehicle is controlled not to exceed a predetermined maximum acceleration value when autonomously driving along the guide route. This preset maximum acceleration value may be a value transmitted from the infrastructure to the vehicle or may be a value stored in the vehicle.

In step (4), a position measurement operation is performed. The target of the position measurement may be a vehicle to be parked in a parking lot, an obstacle existing in the parking lot, or a vehicle that is parked in the parking lot. The infrastructure measures the position of the vehicle or the obstacle and stores the measured position in a database. The infrastructure identifies and detects vehicles or obstacles and monitors the safety of each of the plurality of vehicles in the parking lot. In addition, the infrastructure monitors the operating state of the vehicle that is performing autonomous parking after reaching the target position and transmits an instruction on the basis of the results of the monitoring. The vehicle measures its position. The vehicle transmits the measured position to the infrastructure. The error of the position measured by the vehicle needs to be within a predetermined error range. The predetermined error range is determined by the infrastructure. The vehicle detects obstacles present around the vehicle, measures the positions of the obstacles, and transmits the measured positions of the respective obstacles to the infrastructure. The communication between the vehicle and the infrastructure is performed at a predetermined frequency.

In step (5), an autonomous parking operation is performed by the vehicle. The autonomous parking refers to an operation in which the vehicle that has reached around the target position driverlessly enters a target parking slot. The vehicle performs autonomous parking by sensing nearby obstacles or vehicles that are parked, with the help of a distance sensor mounted on the vehicle. Examples of the distance sensor mounted on the vehicle include an ultrasonic sensor, a RADAR sensor, a LIDAR sensor, and a camera.

In step (6), an emergency braking process is performed. The emergency braking of the vehicle is performed according to instructions transmitted from the infrastructure or may be performed on its own determination when the vehicle detects an obstacle. The infrastructure instructs the vehicle to apply an emergency brake when it is determined that an area around the vehicle is unsafe. When the infrastructure determines that the surroundings of the vehicle become safe after the emergency braking is performed, the infrastructure orders the vehicle to resume autonomous driving or autonomous parking. When the vehicle detects an obstacle, the vehicle applies an emergency brake on its own. In addition, the vehicle reports to the infrastructure the emergency braking that is performed by itself or the type or location of an obstacle which is the cause of the emergency braking.

The vehicle reduces its speed according to a predetermined deceleration value preset for the emergency braking. This predetermined deceleration value is a value determined by the infrastructure or a value stored in the vehicle. The predetermined deceleration value may be determined according to the type of an obstacle, the position of an obstacle, and the distance between the vehicle and an obstacle. The vehicle resumes autonomous driving or autonomous parking upon receiving a resumption instruction for the autonomous driving or autonomous parking from the infrastructure. Alternatively, the vehicle resumes the autonomous driving or autonomous parking when it confirms that the obstacle is removed. The vehicle reports to the infrastructure of the resumption of autonomous driving or autonomous parking and of the removal of the obstacle.

In step (7), the automated valet parking procedure is finished. After the vehicle has completed autonomous driving and autonomous parking, the infrastructure issues a control release instruction to the vehicle. The vehicle can turn on and off the engine and turn on and off the power supply according to instructions received from the infrastructure or without depending on the instructions from the infrastructure. In addition, the vehicle can lock and unlock the vehicle doors according to instructions received from the infrastructure or without depending on the instructions from the infrastructure. Further, the vehicle can apply a parking brake according to instructions received from the infrastructure or without depending on the instructions from the infrastructure.

In step (8), an error control operation is performed. The error control is performed when an error occurs in communication between the vehicle and the infrastructure and/or when a mechanical error of the vehicle occurs. The infrastructure monitors communication between the infrastructure and the vehicle to detect whether a communication error occurs. The vehicle detects a communication error by monitoring the communication between the infrastructure and the vehicle. The vehicle detects whether a mechanical error occurs by monitoring operating states of built-in accessories including sensors mounted thereon. The vehicle detects the presence of a person or animal in the vehicle and applies an emergency brake when the presence of a person or animal is detected. The vehicle resumes autonomous parking or autonomous driving according to instructions received from the infrastructure when the vehicle is in an emergency stop state. Alternatively, the vehicle may determine, by itself, whether the cause of the emergency braking is removed and resumes autonomous parking or autonomous driving when the cause of the emergency parking is removed.

FIG. 5 is a diagram illustrating a communication process performed by a vehicle and a parking infrastructure for automated valet parking according to one embodiment of the present disclosure.

In step (1), vehicle qualification information is delivered from the vehicle to the infrastructure. The vehicle qualification information includes an identifier that distinguishes each vehicle from other vehicles. For example, the vehicle qualification information may be a unique vehicle number (for example, license plate number) of the vehicle. The vehicle qualification information is transmitted at a stage in which the vehicle enters a parking lot and the autonomous valet parking procedure is started (see (1) of FIG. 2A).

In step (2), an autonomous valet parking preparation instruction is transmitted from the infrastructure to the vehicle. The autonomous valet parking preparation instruction is transmitted before the autonomous driving of the vehicle begins.

In step (3), vehicle information is transmitted from the vehicle to the infrastructure. The vehicle information includes state information of the vehicle and position information of the vehicle. The state information of the vehicle includes whether the vehicle is driving, whether the vehicle is stopped, or whether the vehicle is in an emergency stop state. The vehicle information is transmitted periodically at a specific frequency (for example, 1 Hz which means once per second). The vehicle information is used as a parameter to determine whether a communication error has occurred between the vehicle and the infrastructure. For example, when the vehicle information does not reach the infrastructure at a specific time that is estimated according to the communication frequency, the infrastructure determines that an error has occurred in communication between the vehicle and the infrastructure.

In step (4), an acknowledgement of the reception of the vehicle information is transmitted from the infrastructure to the vehicle. The acknowledgement of the reception of the vehicle information is transmitted at the same frequency as the transmission of the vehicle information that is transmitted in step (3). Therefore, the acknowledgement of the reception of the vehicle information is used as a parameter to determine whether an error has occurred in communication between the vehicle and the infrastructure. For example, when the vehicle information does not reach the infrastructure at a specific time that is estimated according to the communication frequency, the infrastructure determines that an error has occurred in communication between the vehicle and the infrastructure.

In step (5), a target position and a guide route are delivered from the infrastructure to the vehicle. The delivery of the target position and the guide route may be performed either before or after an autonomous valet parking start instruction is transmitted from the infrastructure to the vehicle.

In step (6), driving area boundary information is transmitted to the vehicle from the infrastructure. The driving area boundary information includes landmarks (for examples, lines demarcating parking slots, a central line, and lane boundary lines demarcating a driving lane) that mark the boundaries of a permitted driving area. The transmission of the driving area boundary information is performed after the autonomous valet parking preparation instruction is delivered. This driving area boundary information is transmitted from the infrastructure to the vehicle in the form of a parking lot map.

In step (7), the autonomous valet parking start instruction is transmitted from the infrastructure to the vehicle. The transmission of the autonomous valet parking start instruction is performed after the guide route and the driving area boundary information are delivered. Alternatively, the autonomous valet parking start instruction is transmitted when the cause of the emergency braking is removed.

In step (8), an emergency braking instruction is transmitted to the vehicle from the infrastructure.

In step (9), a vehicle control release instruction is transmitted to the vehicle from the infrastructure. The delivery of the vehicle control release instruction is performed after the vehicle is autonomously parked at a parking slot.

FIG. 6 is a diagram illustrating a communication process performed between a parking infrastructure 100 for automated valet parking and a vehicle 200.

In step (1), the vehicle 200 enters a parking lot and stops at a predetermined stop position. This stop position may be an entrance gate of a parking lot. The vehicle 200 reports its arrival to the infrastructure 100. In step (2), the infrastructure 100 measures the dimensions of the vehicle 200 and authenticates the vehicle 200 on the basis of an authentication ID of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot on the basis of the received authentication ID. In step (6), the infrastructure 100 notifies the vehicle whether the vehicle 200 is permitted to enter the parking lot according to the results of the authentication. For example, the infrastructure 100 displays a message indicating approval or disapproval of the entry of the vehicle into the parking lot on a display panel installed around the stop position. The driver drives the vehicle 200 to a drop-off zone when the entry of the vehicle into the parking lot is approved. In step (7), the driver turns off the ignition of the vehicle 200, gets off the vehicle 200, locks the vehicle doors, and leaves the drop-off zone. In step (8), the authority to drive the vehicle 200 is delegated from the vehicle 200 (or the driver) to the infrastructure 100. In addition, in step (9), the infrastructure 100 notifies the driver that it takes the authority to control the vehicle 200 in the parking lot. Such a notification is sent to a driver's smart device through a mobile communication network.

Figure 7:
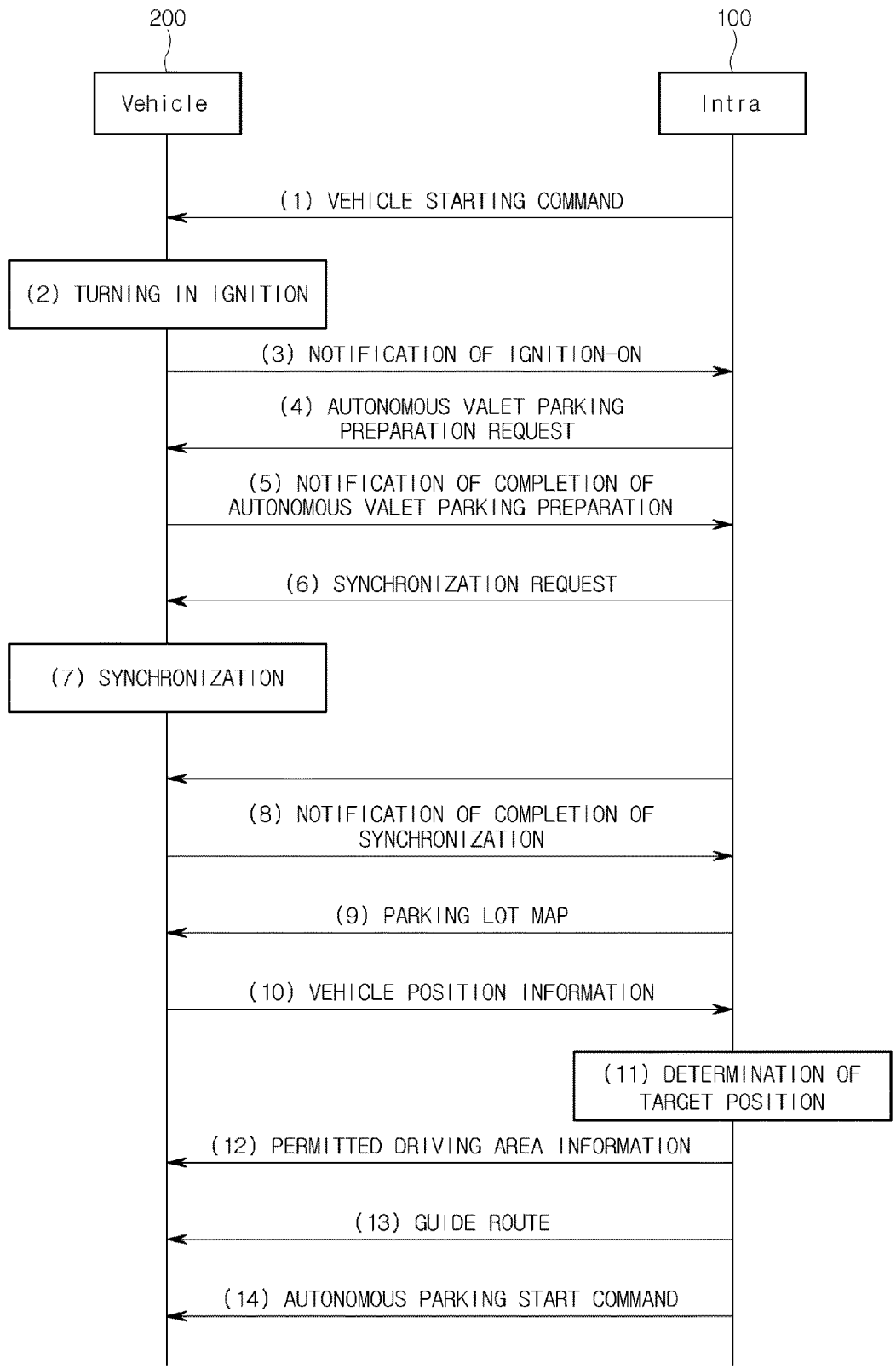
FIG. 7 is a diagram illustrating a communication process performed by a vehicle and a parking infrastructure for automated valet parking according to one embodiment of the present disclosure.

FIG. 7 is a diagram illustrating a communication process performed between a parking infrastructure 100 for automated valet parking and a vehicle 200.

In step (1), the infrastructure 100 transmits an ignition turning-on request to the vehicle 200. In step (2), the vehicle 200 turns on the ignition according to the ignition turning-on request transmitted from the infrastructure 100. In step (3), the vehicle 200 turns on the ignition and then notifies the infrastructure 100 that the ignition is turned on. In step (4), the infrastructure 100 transmits an automated valet parking preparation request to the vehicle 200. In step (5), the vehicle 200 transmits a reply to the automated valet parking preparation request to the infrastructure 100. The replay is a message of OK indicating that the preparation for automated valet parking is completed or a message of NG indicating that the preparation for automated valet parking is not completed.

In step (6), the infrastructure 100 transmits a synchronization request to the vehicle 200. The synchronization request is a request for instructing synchronization of time such that the timer of the infrastructure 100 is synchronized with the timer of the vehicle 200. For example, the synchronization request includes information about time indicated by the timer of the infrastructure 100. In step (7), the vehicle 200 performs the synchronization according to the synchronization request. In step (8), the vehicle 200 transmits a replay indicating that the synchronization is completed to the infrastructure 100. For example, until the synchronization between the infrastructure 100 and the vehicle 200 is completed, a plurality of synchronization requests may be transmitted from the infrastructure 100 to the vehicle 200.

In step (9), the infrastructure 100 transmits parking lot map information to the vehicle 200. The parking lot map information includes landmark information. In step (10), the vehicle 200 estimates or calculates the position of the vehicle 200 on the basis of the transmitted landmark information, and the vehicle 200 transmits the estimated position of the vehicle 200 to the infrastructure 100. In step (11), the infrastructure 100 determines a target position (for example, parking position). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

Figure 8:
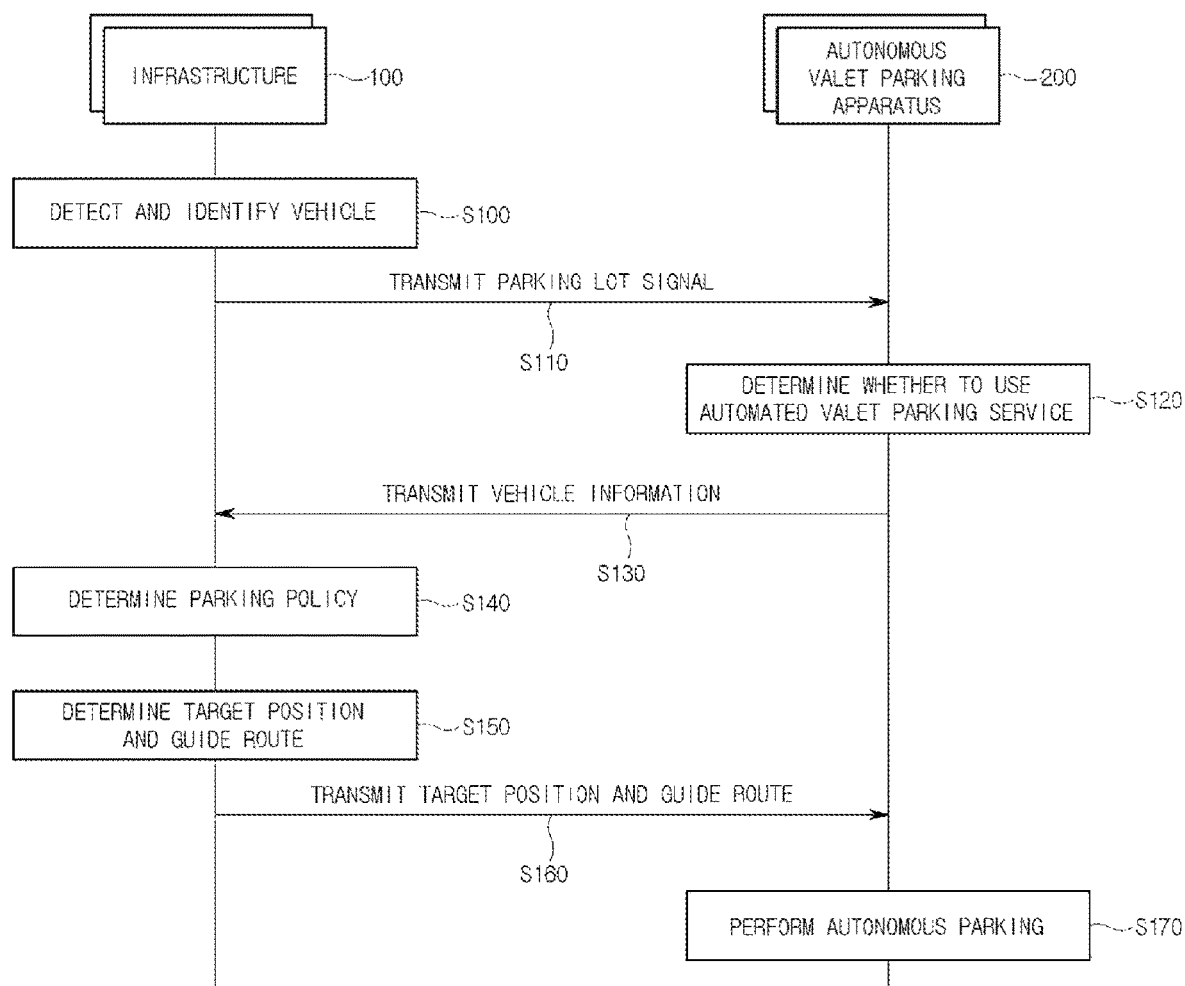
FIG. 8 is a diagram illustrating flows of data in an automated valet parking system according to embodiments of the present disclosure.

FIG. 8 is a diagram illustrating a sequential data flow inside an automated valet parking system according to embodiments of the present disclosure. Referring to FIGS. 1 to 8, a parking infrastructure 100 detects an autonomous valet parking apparatus 200 entering a parking lot in step S100. According to embodiments, the infrastructure 100 detects the autonomous valet parking apparatus 200 and reads the license plate of the autonomous valet parking apparatus 200 to identify the autonomous valet parking apparatus 200.

The infrastructure 100 transmits a parking lot signal to the autonomous valet parking apparatus 200 after identifying the autonomous valet parking apparatus 200 in step S110. According to embodiments, the infrastructure 100 transmits parking lot information to the autonomous valet parking apparatus 200.

The parking lot information includes a parking lot standard code, a parking lot identifier, parking space information, a parking lot map, an individual parking area code, and an individual parking policy.

The parking lot standard code includes information on standard (hereinafter, referred to as parking lot's parking standard) associated with automated valet parking performed or supported by the infrastructure 100. For example, the parking lot standard code refers to the type of automated valet parking performed by the infrastructure 100.

The parking space information includes the number of parking slots in the parking lot, the number of empty parking slots in the parking lot, and identifiers of the respective parking slots.

The individual parking area code includes information indicating each parking area used in a specific parking lot. For example, the individual parking area code includes information indicating a first parking area or a second parking area used in a specific parking lot. According to embodiments, the individual parking area code further includes a parking lot identifier indicating the corresponding parking lot.

The individual parking policy refers to a parking policy used in a parking lot. The individual parking policy may mean a set value used when performing automated valet parking.

The autonomous valet parking apparatus 200 determines whether to use an automated valet parking service in step S120. According to embodiments, the autonomous valet parking apparatus 200 determines whether to use an automated valet parking service by using the set value when entering a parking lot.

The autonomous valet parking apparatus 200 transmits vehicle information to the infrastructure 100. According to embodiments, the autonomous valet parking apparatus 200 transmits vehicle information to the infrastructure 100 on its own or according to an instruction input by the user (i.e., driver), without performing steps S100 to S120.

The vehicle information includes a vehicle standard code, a vehicle identification number, an automated valet parking service utilization code, a temporary parking service utilization code, a temporary parking type code, an interest parking area code, a temporary parking space code, and a preferred parking space code, etc.

The vehicle standard code includes information on standard operations (hereinafter, referred to as vehicle's larking standard) for automated valet parking performed or supported by the autonomous valet parking apparatus 200. For example, the vehicle standard code refers to the type of automated valet parking performed by the autonomous valet parking apparatus 200.

The automated valet parking service utilization code includes information indicating whether the autonomous valet parking apparatus 200 will use an automated valet parking service.

The interest parking area code includes information indicating which parking area is to be used by the autonomous valet parking apparatus 200. According to embodiments, the interest parking area code includes a general parking area code and an individual parking area code.

The general parking area code includes information indicating a parking area that is common in any parking lot, regardless of types of parking lots. For example, the general parking area code includes information indicating a normal parking area, a parking area for the handicapped, a parking area for the pregnant, a parking area for the elderly or the weak, an emergency parking area, a parking area for small vehicles, a parking area for environment-friendly vehicles, or the like.

The temporary parking service utilization code includes information indicating whether the autonomous valet parking apparatus 200 will use a temporary parking service. The temporary parking refers to brief parking in a predetermined area other than a normal parking area in the parking lot. For example, when there is no empty space (i.e., slot) in a target parking area, the autonomous valet parking apparatus 200 may be temporarily parked at a predetermined area and wait until an empty space (i.e., slot) occurs in the target parking area and then move to the target parking area.

The temporary parking type code includes information indicating how the vehicle is to be temporarily parked. According to embodiments, the temporary parking type code indicates how the vehicle is temporarily parked. For example, according to the temporary parking type code, the vehicle may be double-parked in front of or in rear of another vehicle, in a non-parking space on one side of another vehicle, or in a predefined temporary parking area.

The preferred parking space code includes information indicting which type of parking space is preferred by the autonomous valet parking apparatus 200 and information indicating a priority of each type of parking space. For example, the preferred parking space code may include information indicating a first parking space type which means a parking slot with the left side being empty or a second parking space type which means a parking slot with the right side being empty. The autonomous valet parking apparatus 200 performs autonomous valet parking at the parking space determined according to the preferred parking space code when there are multiple parking spaces.

The infrastructure 100 determines a parking policy in step S140. According to embodiments, the infrastructure 100 determines whether the parking lot's parking standard supported by the infrastructure 100 matches with the vehicle's parking standard supported by the autonomous valet parking apparatus and determines the parking policy on the basis of either the vehicle information or the parking lot information according to the determination result. For example, the infrastructure 100 determines whether the vehicle's parking standard matches with the parking lot's parking standard by determining whether the vehicle standard code matches with the parking lot standard code.

That is, the infrastructure 100 determines whether the autonomous valet parking apparatus 200 can use the automated valet parking service provided by the infrastructure 100 and determines the parking policy according to the determination result.

The infrastructure 100 generates the parking policy on the basis of the vehicle information when the parking lot's parking standard matches with the vehicle's parking standard and generates the parking policy on the basis of the parking lot information when the parking lot's parking standard does not match with the vehicle's parking standard.

The infrastructure 100 determines a target position and a guide route in step S150. According to embodiments, the infrastructure 100 determines the target position and the guide route on the basis of the determined parking policy.

When the parking policy is generated on the basis of the parking lot information, the infrastructure 100 makes a request for confirmation of the parking policy with respect to the autonomous valet parking apparatus 200 or the driver.

The autonomous valet parking apparatus 200 may confirm the parking policy when the confirmation request is issued. In this case, the infrastructure 100 determines the target position on the basis of the parking policy.

The autonomous valet parking apparatus 200 may transmit a parking policy change request to the infrastructure 100. In this case, the infrastructure 100 determines a new parking policy in response to the parking policy change request and makes a request for confirmation of the new parking policy.

The autonomous valet parking apparatus 200 may transmit a signal for stopping the automated valet parking in response to the confirmation request.

The infrastructure 100 transmits a target position and a guide route to the autonomous valet parking apparatus 200 in step S160.

The autonomous valet parking apparatus 200 performs autonomous valet parking on the basis of the target position and the guide route in step S170.

Figure 9:
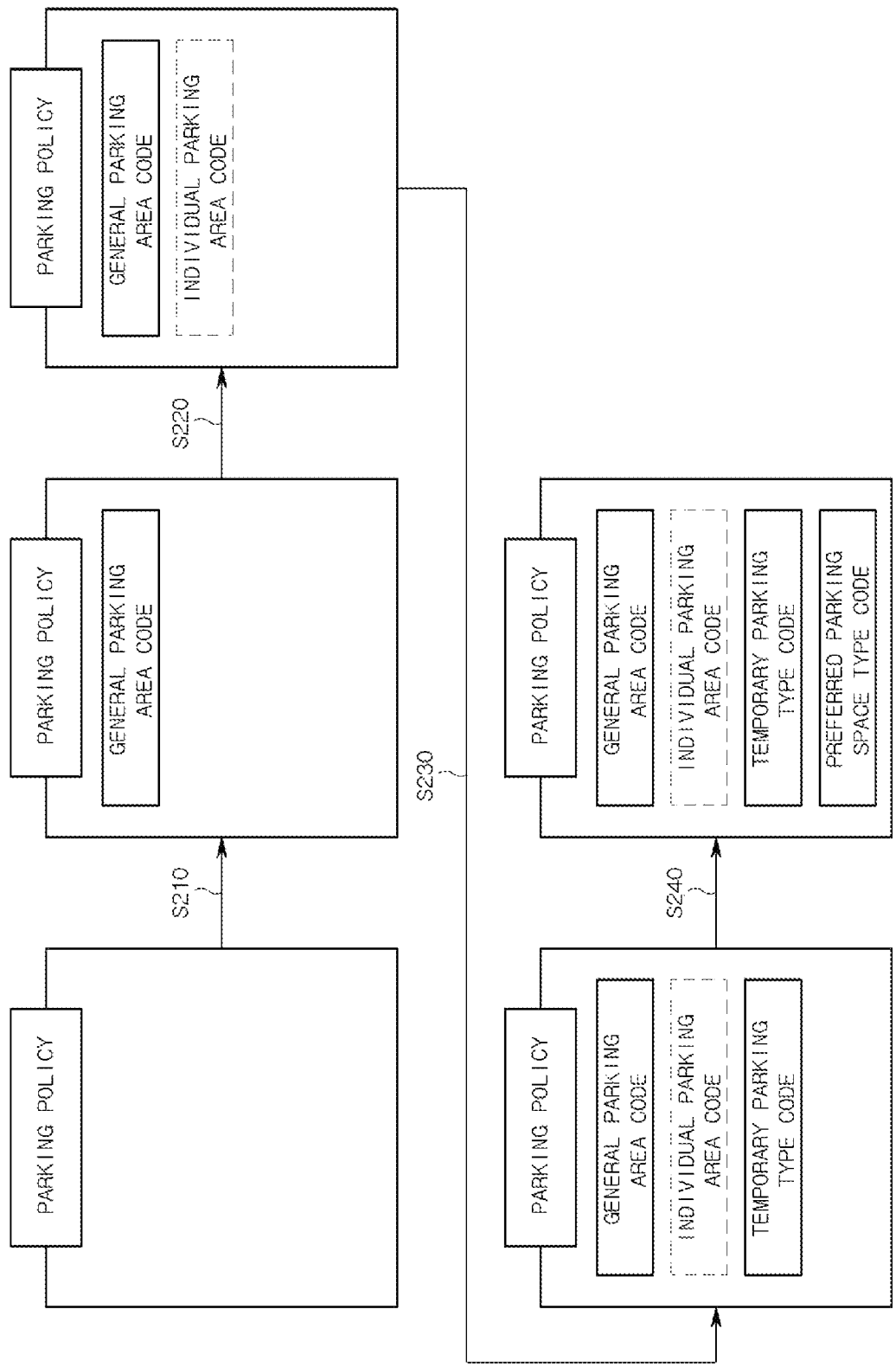
FIG. 9 is a diagram illustrating a process of determining a parking policy according to embodiments of the present disclosure.

FIG. 9 is a diagram illustrating a process of determining a parking policy according to embodiments of the present disclosure. Referring to FIGS. 1 through 9, a parking policy is generated with the use of a general parking area code. According to embodiments, the parking policy may include the general parking area code in step S210. That is, the infrastructure 100 generates the parking policy including the general parking area code included in the vehicle information transmitted from the autonomous valet parking apparatus 200. The general parking area code is a code indicating a general parking area.

The parking policy can be generated with the use of an individual parking area code in addition to the general parking area code. According to embodiments, the parking policy may further include the individual parking area code in step S220. That is, the infrastructure 100 generates the parking policy including the individual parking area code in addition to the general parking area code when the transmitted vehicle information includes the individual parking area code in which a parking lot identifier corresponding to the infrastructure 100 is included.

The individual parking area code is a code indicating a parking area used in a specific parking lot. The general parking area code and the individual parking area code are collectively called the interest parking area code.

The parking policy can be generated with the use of a temporary parking type code in addition to the interest parking area code. According to embodiments, the parking policy may include the temporary parking type code in step S230. That is, the infrastructure 100 generates the parking policy further including the temporary parking type code when the temporary parking service utilization code included in the vehicle information indicates an intention of using a temporary parking service.

The parking policy can be generated with the use of a preferred parking space code in addition to the temporary parking type code. According to embodiments, the parking policy may further include the preferred parking space code in step S240. That is, the infrastructure 100 generates the parking policy further including the preferred parking space code.

Figure 10:
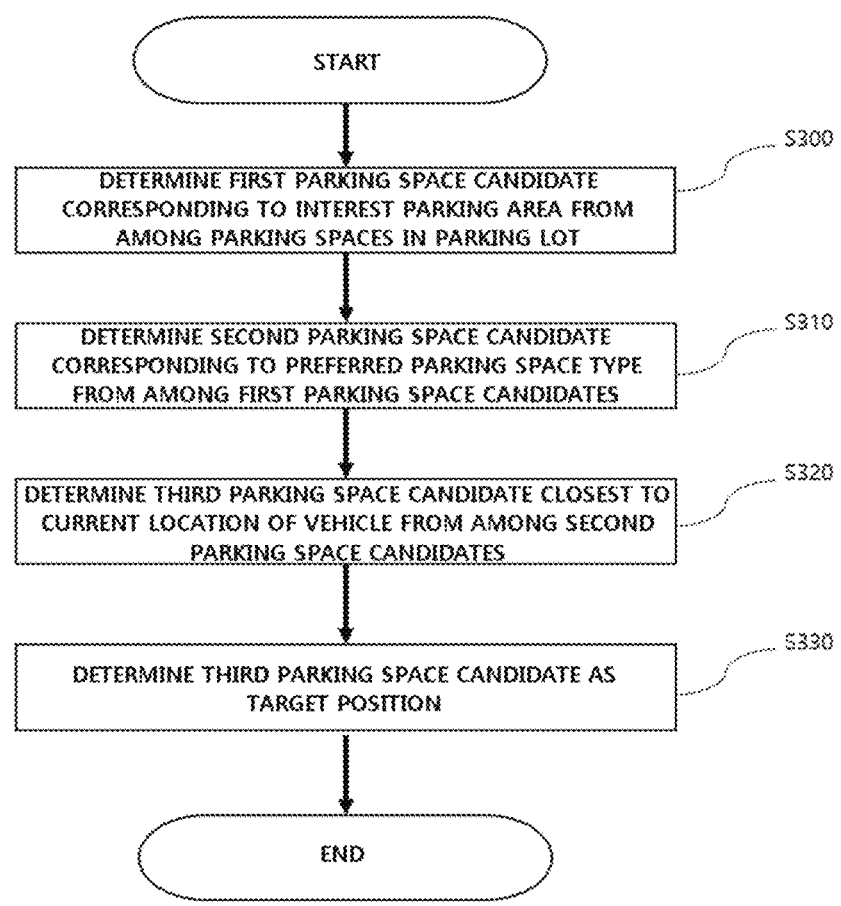
FIG. 10 is a flowchart illustrating a method of activating a parking infrastructure, according to embodiments of the present disclosure.

FIG. 10 is a flowchart illustrating a method of activating a parking infrastructure 100 according to embodiments of the present disclosure. Specifically, FIG. 10 illustrates a method in which the infrastructure 100 determines a target position and a guide route. Referring to FIGS. 1 through 10, the infrastructure 100 determines first parking space candidates belonging to the interest parking area all the parking spaces within the parking lot in step S200. That is, the infrastructure 100 determines a parking space within a parking area that can be used by the autonomous valet parking apparatus 200 from among the parking spaces within the parking lot.

That is, the infrastructure 100 determines the first parking space candidates corresponding to the interest parking area on the basis of the interest parking area code.

The infrastructure 100 determines second parking space candidates corresponding to a preferred parking space, from among the first parking space candidates in step S310. That is, the infrastructure 100 determines a parking space that is preferred by the autonomous valet parking apparatus 200 from among the first parking space candidates.

That is, the infrastructure 100 selects the second parking space candidates that are preferred by the autonomous valet parking apparatus 200 from among the first parking space candidates on the basis of the preferred parking space code.

The infrastructure 100 selects a third parking space candidate closest to the current location of the autonomous valet parking apparatus 200 from among the second parking space candidates. For example, the infrastructure 100 selects the third parking space candidate on the basis of the locations of the second parking space candidates and the current location of the autonomous valet parking apparatus 200.

The infrastructure 100 determines the third parking space candidate as the target position in step S330. That is, the infrastructure 100 determines the most suitable parking space for the autonomous valet parking apparatus 200 as the target position among available parking spaces according to various conditions or a predetermined priority.

In one or more exemplary embodiments, the described functions may be implemented in the form of hardware, software, firmware, or any combination thereof. When implemented in the form of software, these functions may be stored on or transmitted to a computer-readable medium in the form of one or more instructions or codes.

The computer-readable medium refers to any medium that can transfer a computer program from one computer to another. For example, it may be a communication medium or a computer-readable storage medium. The storage medium may be an arbitrary medium that can be accessed by a computer. The computer-readable media include, not limitedly, RAMs, ROMs, EEPROMs, optical discs such as CD-ROM, magnetic disks, and any media that can be accessed by computers and which can be used to transfer a computer program in the form of instructions from one place to another. The computer-readable media are appropriately referred to as media that can be arbitrarily accessed by computers.

For example, software can be transferred from a website, server or other remote sources through a cable or over a wireless channel. Examples of the cables include coaxial cable, fiber optic cable, twisted pair cable, and digital subscriber line (DSL). Examples of the wireless channel include infrared frequency waves, radio frequency waves, and ultrahigh frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a Blu-ray disc. Discs generally refer to media from which data is optically read and disks refer to media from which data is magnetically read. Combinations of the above-mentioned media also fall within the definition of the computer-readable medium.

When embodiments are implemented as program code or code segments, the code segment may be a procedure, function, subprogram, program, routine, subroutine, module, software package, class, instructions, data structures, program command strings, or an arbitrary set of program command strings. One code segment may be connected with another code segment or a hardware circuit in a manner of transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more exemplary embodiments. Of course, the above-described embodiments do not cover all possible combinations of components and/or methods to implement the present invention. Thus, those skilled in the art will appreciate that many further combinations and substitutions of components and/or methods in various embodiments are possible. Accordingly, the above-described embodiments cover all such alterations, modifications, and variations that fall within the spirit and scope of the appended claims. Moreover, as to the scope of the terms "comprises" used in the detailed description or the appended claims, it is noted that it is similarly interpreted as "comprising" that is used as a transitional word in the claims.

As used herein, the term "infer" or "inference" generally refers to a process of determining or inferring a state of a system, environment, and/or user from a set of observations of events and/or data. Inferring can be used to identify a specific situation or action, or can generate a probability distribution of certain states, for example. Inferring is probabilistic. That is, inferring may mean a calculation of a probability distribution of those states, based on study on data and events. Inferring may involve techniques used to construct a higher level event from a set of events and/or data. The inference refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, not necessarily, computer entities such as hardware, firmware, any combination of hardware and software, software, and a software program being executed. For example, the term "component" may refer to, not necessarily, a process running on a processor, a processor, an object, an executable execution thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

What is claimed is:

1. An infrastructure for automated valet parking, the infrastructure comprising:
a transceiver configured to receive vehicle information from a vehicle and transmit a target position and a guide route to the vehicle; and
a processor configured to determine a parking policy based on the vehicle information received and parking lot information stored and to determine the target position and the guide route based on the determined parking policy,
wherein the vehicle information includes a vehicle standard code that refers to a type of automated valet parking performed by the vehicle,
wherein the parking lot information includes a parking lot standard code that refers to the type of automated valet parking performed by the infrastructure, and
wherein the processor is further configured to:
determine whether the parking lot standard code matches with the vehicle standard code, and
determine the parking policy using the vehicle information or the parking lot information based on whether the parking lot standard code matches with the vehicle standard code.

2. The infrastructure according to claim 1, wherein the vehicle information further includes a vehicle identification number, a vehicle class, automated valet parking service utilization information, temporary parking service utilization information, a parking area, a preferred parking space type, or a parking standard code.

3. The infrastructure according to claim 1, wherein the vehicle information further includes a plurality of information components, each of the plurality of information components comprising information selected from a group consisting of a vehicle identification number, a vehicle class, automated valet parking service utilization information, temporary parking service utilization information, a parking area, a preferred parking space type, and a parking standard code.

4. The infrastructure according to claim 1, wherein the parking lot information includes a parking lot identifier, parking space information, a parking lot map, an individual parking area code, or an individual parking policy.

5. The infrastructure according to claim 1, wherein the processor is configured to generate the parking policy based on the vehicle information when the parking lot standard code matches with the vehicle standard code; and
the processor is configured to generate the parking policy based on the parking lot information when the parking lot standard code does not match with the vehicle standard code.

6. The infrastructure according to claim 5, wherein the processor is configured to determine the target position and the guide route based on the parking policy according to a confirmation signal transmitted from the vehicle when the parking lot standard code does not match with the vehicle standard code.

7. The infrastructure according to claim 1, wherein the parking policy includes information on an interest parking area, information on a temporary parking type, temporary parking service utilization information, and information on a preferred parking space.

8. The infrastructure according to claim 7, wherein the processor is configured to determine one or more first parking space candidates corresponding to the interest parking area from among parking spaces in a parking lot, to select one or more second parking space candidates from among the one or more first parking space candidates based on the information on the preferred parking space, and to determine one of the selected second parking space candidates as the target position.

9. The infrastructure according to claim 8, wherein the processor is configured to select a third parking space candidate closest to a current location of the vehicle from among the one or more second parking space candidates and to determines the third parking space candidate as the target position.

10. An automated valet parking method executed by an infrastructure communicatively coupled with a vehicle capable of performing autonomous valet parking, the method comprising:
receiving, by the infrastructure, vehicle information from the vehicle;
determining, by the infrastructure, a parking policy based on the vehicle information received from the vehicle and parking lot information stored in the infrastructure;
determining, by the infrastructure, a target position and a guide route based on the parking policy; and
transmitting, by the infrastructure, the target position and the guide route to the vehicle,
wherein the vehicle information includes a vehicle standard code that refers to a type of automated valet parking performed by the vehicle,
wherein the parking lot information includes a parking lot standard code that refers to the type of automated valet parking performed by the infrastructure, and
wherein the determining of the parking policy comprises:
determining whether the parking lot standard code matches with the vehicle standard code; and
determining the parking policy using the vehicle information or the parking lot information based on whether the parking lot standard code matches with the vehicle standard code.

11. The method according to claim 10, wherein the vehicle information further includes a vehicle identification number, a vehicle class, automated valet parking service utilization information, temporary parking service utilization information, a parking area, a preferred parking space, or a parking standard code.

12. The method according to claim 10, wherein the parking lot information further includes a parking lot identifier, parking space information, a parking lot map, an individual parking area code, and an individual parking policy.

13. The method according to claim 10, wherein determining the parking policy using the vehicle information or the parking lot information comprises:
generating the parking policy based on the vehicle information when the parking lot standard code matches with the vehicle standard code; and
generating the parking policy based on the parking lot information when the parking lot standard code does not match with the vehicle standard code.

14. The method according to claim 13, further comprising determining, by the infrastructure, the target position and the guide route based on the parking policy in response to a confirmation signal transmitted from the vehicle when the parking policy is generated based on the parking lot information.

15. The method according to claim 10, wherein the parking policy includes information on an interest parking area, information on a temporary parking type, temporary parking service utilization information, and information on a preferred parking space.

16. The method according to claim 15, wherein determining the target position comprises:
selecting one or more first parking space candidates corresponding to the interest parking area from among parking spaces within a parking lot; and
selecting one or more second parking space candidates based on the information on the preferred parking space from among the one or more first parking space candidates.

17. The method according to claim 16, wherein determining the target position further comprises selecting one parking space closest to a current location of the vehicle from among the one or more second parking space candidates and determining the selected parking space as a third parking space candidate.

18. A non-transitory computer-readable recording medium storing a program including instructions for performing the automated valet parking method according to claim 10.

19. A system for automated valet parking, the system comprising:
a processor configured to
determine a parking policy based on received vehicle information and stored parking lot information, wherein the vehicle information includes a vehicle standard code that refers to a type of automated valet parking performed by the vehicle, and the parking lot information includes a parking lot standard code that refers to the type of automated valet parking performed by the system, and the processor is configured to determine the parking policy by
  determining whether the parking lot standard code matches with the vehicle standard code, and
  determining the parking policy based on whether the parking lot standard code matches with the vehicle standard code; and
determine a target position and a guide route based on the determined parking policy.

20. The system of claim 19, wherein:
the processor is configured to be coupled to a transceiver;
the processor is configured to receive the vehicle information from a vehicle via the transceiver; and
the processor is configured to transmit the guide route to the vehicle via the transceiver.

\* \* \* \* \*